United States Patent
Trowbridge

(10) Patent No.: US 6,402,128 B1
(45) Date of Patent: Jun. 11, 2002

(54) AIR SPRING WITH LATERAL RESTRAINT AND AXIAL CONTROL

(75) Inventor: Mark Guy Trowbridge, Stow, OH (US)

(73) Assignee: The Goodyear Tire and Rubber Company, Akron, OH (US)

(*) Notice: Subject to any disclaimer, the term of this patent is extended or adjusted under 35 U.S.C. 154(b) by 0 days.

(21) Appl. No.: 09/494,416

(22) Filed: Jan. 31, 2000

(51) Int. Cl.[7] ............................................... F16F 9/04
(52) U.S. Cl. ........................... 267/64.21; 267/64.11; 267/64.23; 267/64.28; 267/64.18
(58) Field of Search ........................... 267/64.11, 64.15, 267/64.16, 64.17, 64.19, 64.21, 64.24, 64.25, 64.23, 64.26, 64.27, 64.28, 64.18, 64.22; 188/289

(56) References Cited

U.S. PATENT DOCUMENTS

| | | | | |
|---|---|---|---|---|
| 3,246,905 A | * | 4/1966 | Morgan | 280/6 |
| 3,790,147 A | * | 2/1974 | Owen | 267/65 B |
| 4,354,693 A | * | 10/1982 | Maeda et al. | 280/714 |
| 4,588,171 A | * | 5/1986 | Stephens | 267/64.24 |
| 4,666,135 A | * | 5/1987 | Buma et al. | 267/64.21 |
| 4,722,516 A | * | 2/1988 | Gregg | 267/64.27 |
| 4,741,517 A | * | 5/1988 | Warmuth, II et al. | 267/64.24 |
| 4,844,428 A | | 7/1989 | Margolis et al. | 267/64.21 |
| 4,844,429 A | * | 7/1989 | Ecktman | 267/64.24 |
| 4,854,555 A | * | 8/1989 | Ohkawa et al. | 267/64.24 |
| 4,934,667 A | * | 6/1990 | Pees et al. | 267/64.21 |
| 5,316,273 A | * | 5/1994 | Vaphiadis | 267/64.24 |
| 5,386,975 A | * | 2/1995 | Wallis | 267/119 |
| 5,413,316 A | | 5/1995 | Easter | 267/64.24 |
| 5,669,597 A | * | 9/1997 | Rittstieg et al. | 267/64.17 |
| 6,065,741 A | * | 5/2000 | Davis et al. | 267/64.26 |

FOREIGN PATENT DOCUMENTS

| | | |
|---|---|---|
| EP | 0075969 | 4/1983 |
| EP | 0 166 702 | 6/1985 |
| FR | 2 663 100 | 6/1990 |
| JP | 8028618 | 2/1996 |
| JP | 8177925 | 7/1996 |

* cited by examiner

Primary Examiner—Paul N. Dickson
Assistant Examiner—Benjamin A Pezzlo
(74) Attorney, Agent, or Firm—Nancy T. Krawczyk

(57) ABSTRACT

The air spring is comprised of a flexible airsleeve, a retainer, and a main piston. The airsleeve is secured at one end by the retainer and at the opposing end by the main piston. A hollow restraining piston extends from the retainer and into the main piston. The restraining piston acts as a lateral stabilizer, over extension restraint and height control. The hollow region in the restraining piston communicates through at least one passage with an air chamber formed between the airsleeve and the outer surfaces of the restraining piston and the main piston. Fluid is admitted to or exhausted from the air spring through a valve which functions relative to the displacement of the restraining piston and the main piston.

8 Claims, 3 Drawing Sheets

AIR SPRING WITH LATERAL RESTRAINT AND AXIAL CONTROL

FIELD OF THE INVENTION

The present invention is directed toward an air spring. More specifically, the present invention is directed towards an air spring that combines functions of separate components of a suspension system of a vehicle into a single unit.

BACKGROUND OF THE INVENTION

When a vehicle is in motion, the road disturbances encounter by the vehicle input kinetic energy into the passenger cabin of the vehicle and that energy must be dissipated for the comfort of the passenger and any cargo being carried by that vehicle. To dissipate the energy, it is known in the art to employ the use of either shock absorbers or air springs.

U.S. Pat. No. 4,844,428 discloses an air spring assembly wherein the air spring assembly can be adjusted to obtain an optimum spring constant. The air spring is comprised of a shock absorber and a reversible electric motor to vary the spring constant of the air spring. While the disclosed air spring combines many functions, the entire air spring is cumbersome and complex.

U.S. Pat. No. 4,786,035 discloses an air spring with an internal restraint. The air spring is provided with an elongated flexible strap that extends between the end members of the air spring. While this provides the air spring with a means of limited restraint, there is no means for limiting the radial movement of the air spring.

SUMMARY OF THE INVENTION

The present invention is directed towards an air spring that combines functions formerly provided by separate components into a single unit. The air spring combines at least two of the following functions: axial spring, lateral stabilizer, jounce bumper, damper, over extension restraint and height control.

The air spring of the present invention is comprised of a flexible airsleeve, a retainer, and a main piston. The airsleeve is secured at one end by the retainer and at the opposing end by the main piston. A hollow restraining piston extends from the retainer and into the main piston. The restraining piston acts as a lateral stabilizer, over extension restraint and height control.

In another aspect of the inventive air spring, the hollow region in the restraining piston communicates through at least one passage with an air chamber formed between the airsleeve and the outer surfaces of the restraining piston and the main piston.

In another aspect of the invention, the air spring is further comprised of a valve. The valve selectively admits or exhausts a fluid from the air spring as a function of the relative displacement of the restraining piston and the main piston.

In another aspect of the air spring, the restraining piston grips an upper portion of the valve to selectively admit or exhaust the fluid. The valve admits fluid into the air spring when the air spring is at a jounce position and the valve exhausts fluid when the air spring is at a rebound position.

In another aspect of the air spring, a pressure chamber is formed between the restraining piston and the main piston. The pressure chamber communicates through at least one passage with the hollow region of the restraining piston. At least one of the passages between the pressure chamber and the hollow interior of the restraining piston being a check valve.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
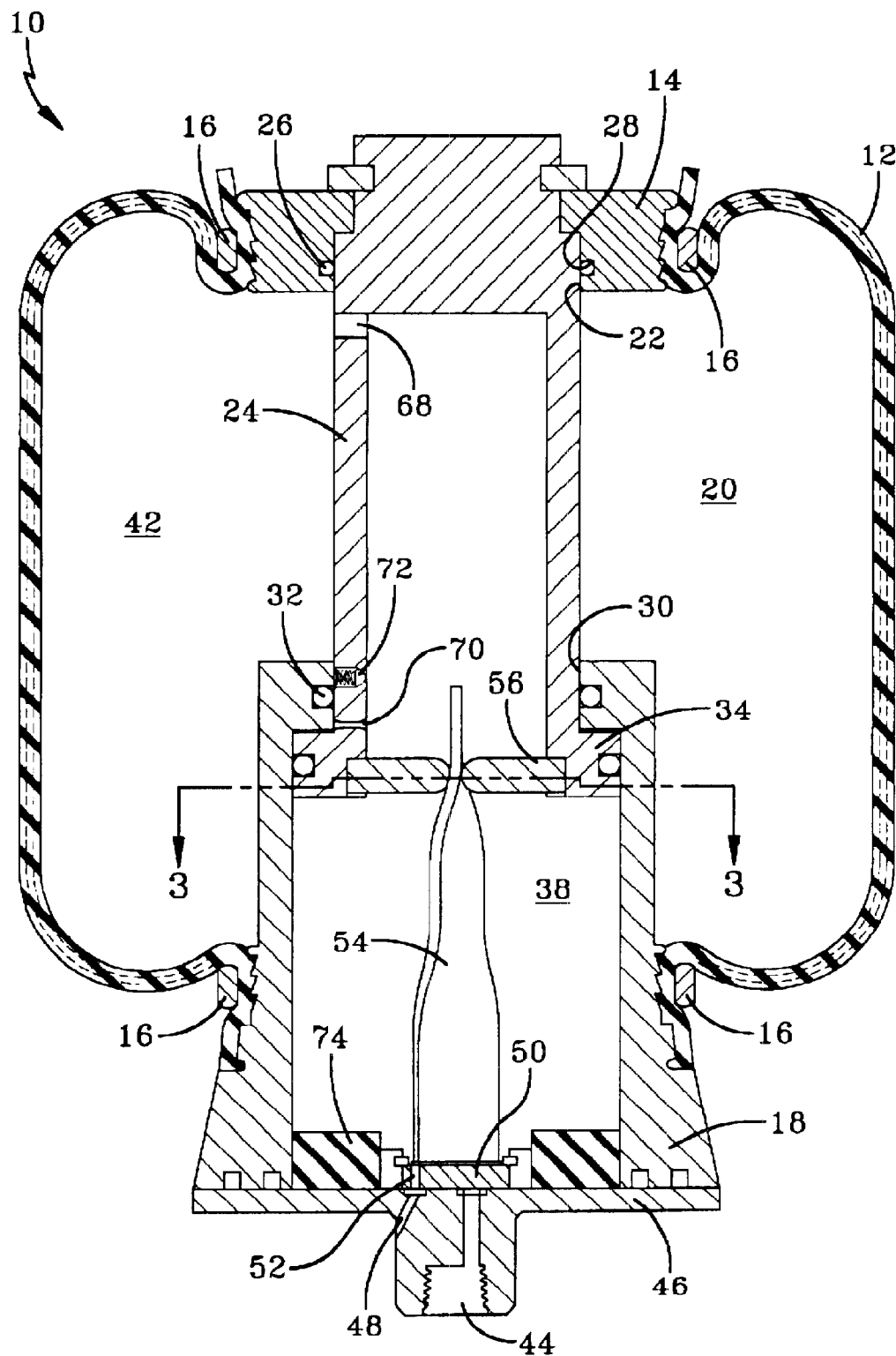
FIG. 1 is a cross-sectional view of the inventive air spring

By way of example, and not limiting the different features of the present invention, FIG. 1 illustrates an air spring 10 in accordance with the present invention. The air spring 10 has a cylindrical airsleeve 12. The airsleeve 12 is typically constructed from at least one layer of rubberized reinforcing cord. The airsleeve 12 is secured at one end to the upper retainer 14 and at the second end to a main piston 18. The airsleeve 12 is secured at both ends by securing rings 16, a conventional technique in the art. Alternatively, at least the upper end of the airsleeve 12 may be secured by an internal bead and crimping retainer plate, which are conventional and known to those skilled in the art. The airsleeve 12 is illustrated as a rolling lobe type construction, but a bellows type construction with a plurality of lobes may be employed as the airsleeve 12. The airsleeve 12 encloses a volume 20.

The upper retainer 14 has a central aperture 22, in which a restraining piston 24 is secured. To maintain an airtight seal between the upper retainer 14 and the restraining piston 24, an o-ring 26 may be inserted into a groove 28 located within the aperture 22. The restraining piston 24 extends through a central aperture 30 into the main piston 18. Similar to the upper end of the restraining piston 24, an airtight seal may be obtained with an o-ring 32 in a groove located within the aperture 30.

A radially extending flange 34 defines the lower end of the restraining piston 24. The flange 34 may also be provided with an o-ring similar in construction to those previously disclosed. As seen in FIG. 1, the majority of the restraining piston 24 has a diameter approximately equivalent to the aperture 30 of the main piston 18. The outermost diameter of the radially extending flange 34 is approximately equivalent to the interior diameter of the main piston 18. Due to these diameter relationships, three interrelated air chambers are created within volume 20.

The first chamber 38 is within the restraining piston 24, and can include the volume within the main piston 18 when the air spring 10 is in a rebound position, as illustrated in FIG. 1. The second chamber 40 is between the outer surface of the restraining piston 24 and the interior of the main piston, see FIG. 2. The third chamber 42 is a toroidal area between the airsleeve 12 and the exterior of the restraining piston 24 and the main piston 18. The volume of the first, second, and third chambers 38, 40, 42 is variable, as will be discussed further below.

The enclosed volume 20, and the first, second, and third chambers 38, 40, 42, are pressurized with compressed fluid, preferably air, through the inlet port 44 at the base 46 of the main piston 18. Adjacent to the inlet port 44 in the main piston base 46 is an exhaust port 48. Between the ports 44, 48 and the first chamber 38 is a flat disk 50 functioning as a valve. The disk 50 has an offset hole 52 and is free to rotate about its center. Centrally attached to the disk 50 is a rigid twisted ribbon 54 that engages a guide means 56 on the interior side of the restraining piston 24. The illustrated ribbon 54 is twisted so that each edge 58 travels through a ninetydegree arc. The arc through which the ribbon 54 travels may be greater or less than ninety degrees depending upon the twist characteristics of the ribbon 54. This characteristic will vary with the dimensions of the air spring 10.

Figure 3A:
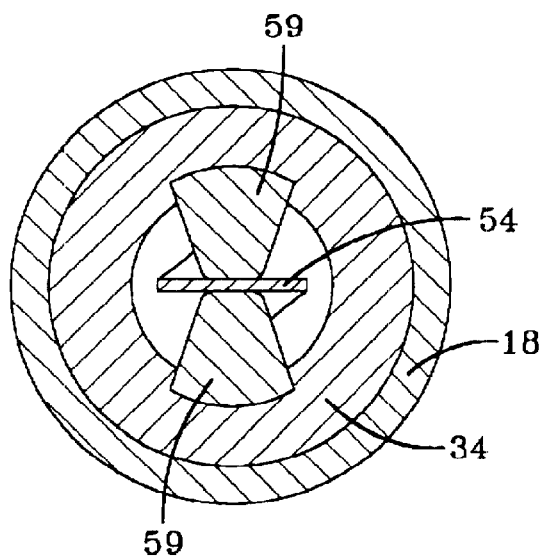
FIGS. 3A–3C are various embodiments of the guide means.
Figure 3B:
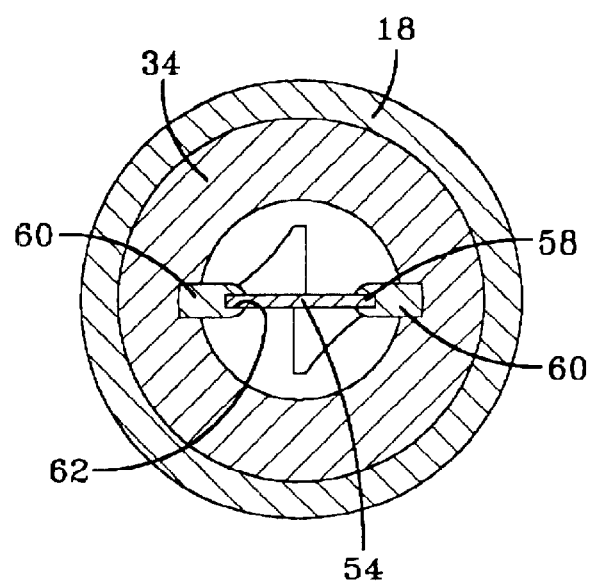
Figure 3C:
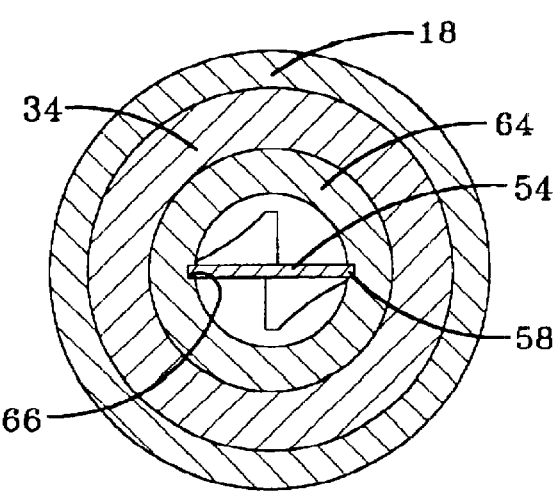

The guide means 56 may be constructed in a plurality of ways, as seen in FIGS. 3A–3C. As illustrated in FIG. 3A, the guide means 56 may be a pair of extending projections 59 that grip almost the full width of the central portion of the ribbon 54. Alternatively, the extending projections 60 may be provided with a slot 62 for engaging the ribbon edges 58, see FIG. 3B. The guide means 56 may also be a continuous circular element 64, see FIG. 3C. The circular guide 64 has two radially opposing slots 64 into which the ribbon edges 58 are inserted. Whatever means is used to grip the ribbon 54, the guide means 56 should have a curvature that compensates for the curvature of the ribbon 54, allowing the guide means, and thus the restraining piston 24, to travel freely along the length of the ribbon 54.

Because of the twist of the ribbon 54, and the rigid mounting of the ribbon 54 in the rotatable disk 50, as the restraining piston 24, and the attached guide means 56, moves from an expanded position to a compressed position, the ribbon 54, and thus, the disk 50, is rotated. The rotation of the ribbon 54 and the disk 50 results in three operating positions of the disk 50.

When the air spring 10 is at its rebound height, i.e. its maximum height, as seen in FIG. 1, the disk 50 is rotated so that the offset hole 52 and the exhaust port 44 are aligned, permitting compressed fluid out of the first chamber 38. At this position, the first chamber 38 is at its maximum volume, as it includes the volume within the interior of the main piston 18. Fluid enters and exits the third chamber 42 through a passageway 68 located in the restraining piston. The second chamber 40 has a zero volume.

As the air spring 10 is being compressed, the disk 50 is rotated wherein the offset hole 52 is not aligned with either port 44, 48, preventing any air from entering or escaping from the air spring 10. However, in this position, the second chamber volume begins to increase as fluid flows through an orifice restriction 70. Concurrently, the volume of the first and third chambers 38, 42 begin to decrease.

Figure 2:
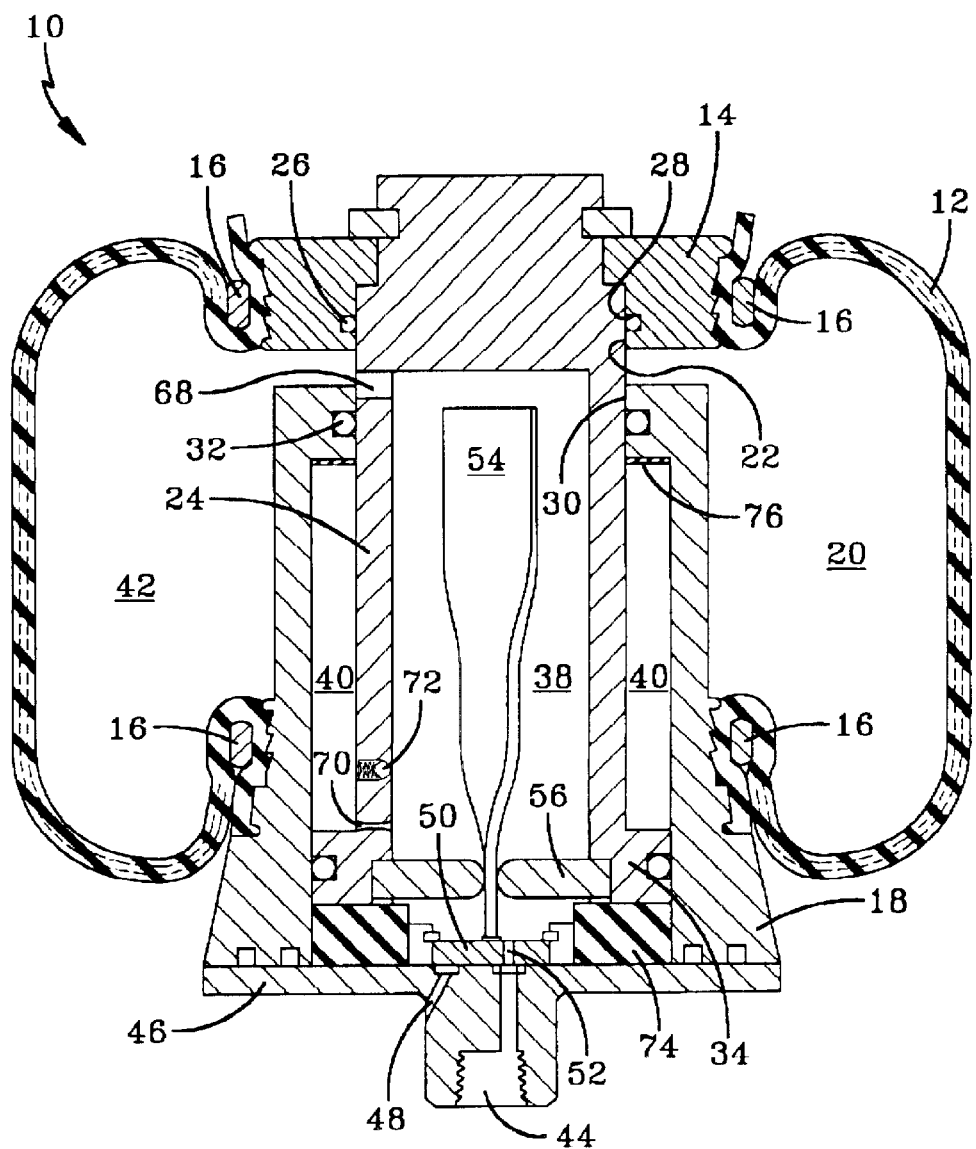
FIG. 2 is a cross-sectional view of the air spring when in a compressed state.

When the air spring 10 is in the jounce position, i.e. its minimum height, the offset hole 52 is aligned with the inlet port 44, permitting the supply of compressed fluid to enter the enclosed volume 20, see FIG. 2. When the air spring 10 is in this position, the second chamber, which acts as a rebound pressure chamber, is at its maximum volume. To further control the pressure within the second chamber, a check valve 72 may be installed. Between the restraining piston 24 and the end of the main piston 18 is a rubber bumper 74 to absorb excessive jounce loading. Conversely, for severe rebound conditions, a rebound bumper 76 is provided between the restraining piston 24 and the open end of the main piston 18.

To achieve a desired ride quality, check valves or flow controls may be inserted into the inlet or exhaust ports 44, 48. The exhaust port 48 may be vented directly to the atmosphere, or it may be vented into a reservoir that also supplies the inlet port.

It should be noted that when the suspension of the vehicle upon which the air spring 10 is mounted is dropped, the air spring 10 is placed in a service mode, wherein all of the fluid within the air spring 10 is vented. When the air spring is restored to the jounce position, the fluid is restored to the air spring 10 is restored and the air spring 10 is ready to function.

The interconnecting relationship between the restraining piston 24 and the main piston 18 provides lateral restraint to the air spring 10, thus eliminating the need to supply an external lateral restraint means to the air spring 10. This construction also combines within the air spring 10 a damper, jounce bumper, rebound restraint and height control means.

While the illustrated air spring 10 is not shown with any mounting means to secure the air spring 10 in its intended application, those of skill in the art would readily appreciate that the mounting configuration of the air spring 10 is determined by the end requirements and the system into which the air spring 10 is being mounted.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the fully intended scope of the invention as defined by the following appended claims.

What is claimed is:

1. An improved air spring (10) filled with a compressed fluid, the air spring comprising:

a retainer (14);

a main piston (18);

an airsleeve (12), the airsleeve (12) being secured at one end by the retainer (14) and at the opposing end by the main piston (18);

a hollow restraining piston (24) extending from the retainer (14) and into the main piston (18), the restraining piston (24) having a hollow region (38) which communicates through at least one passage (68) with an air chamber (42) formed between the airsleeve (12) and the outer surfaces of the restraining piston (24) and the main piston (18), the passage (68) permitting the fluid to flow into and out of the air chamber (42); and a valve (50) located in the base (46) of the main piston (18), the valve (50) selectively admitting or exhausting a compressed fluid into and out of the air spring (10) as a function of the relative displacement of the restraining piston (24) and the main piston (18).

2. An improved air spring (10) in accordance with claim 1, the valve (50) being capable of rotating within the base (46) of the main piston (18).

3. An improved air spring (10) in accordance with claim 1, the restraining piston (24) gripping an upper portion of the valve (50) to selectively admit or exhaust the fluid.

4. An improved air spring (10) in accordance with claim 3, the upper portion of the valve (50) being comprised of an extending twisted ribbon (54) fixedly attached to the center of the valve (50).

5. An improved air spring (10) in accordance with claim 1, the valve (50) admitting the fluid into the air spring (10) when the air spring (10) is at a jounce position and the valve (50) exhausting the fluid when the air spring (10) is at a rebound position.

6. An improved air spring (10) in accordance with claim 1, the valve (50) being mounted in the base (46) of the main piston (18) above an inlet port (44) and an exhaust port (48), wherein the valve (50) is comprised of an offset hole (52) which rotates to communicate with either port (44 or 48) to admit or exhaust the fluid.

7. An improved air spring (10) in accordance with claim 1, a pressure chamber (40) located between the restraining piston (24) and the main piston (18), the pressure chamber (40) communicating through at least one passage (70 or 72) with the hollow region (38) of the restraining piston (24).

8. An improved air spring (10) in accordance with claim 7, at least one of the passages between the pressure chamber (40) and the hollow interior (38) of the restraining piston (24) being a check valve (72).

\* \* \* \* \*